P. B. RABE.
BATTERY GRID.
APPLICATION FILED APR. 30, 1919.
1,347,873.
Patented July 27, 1920.
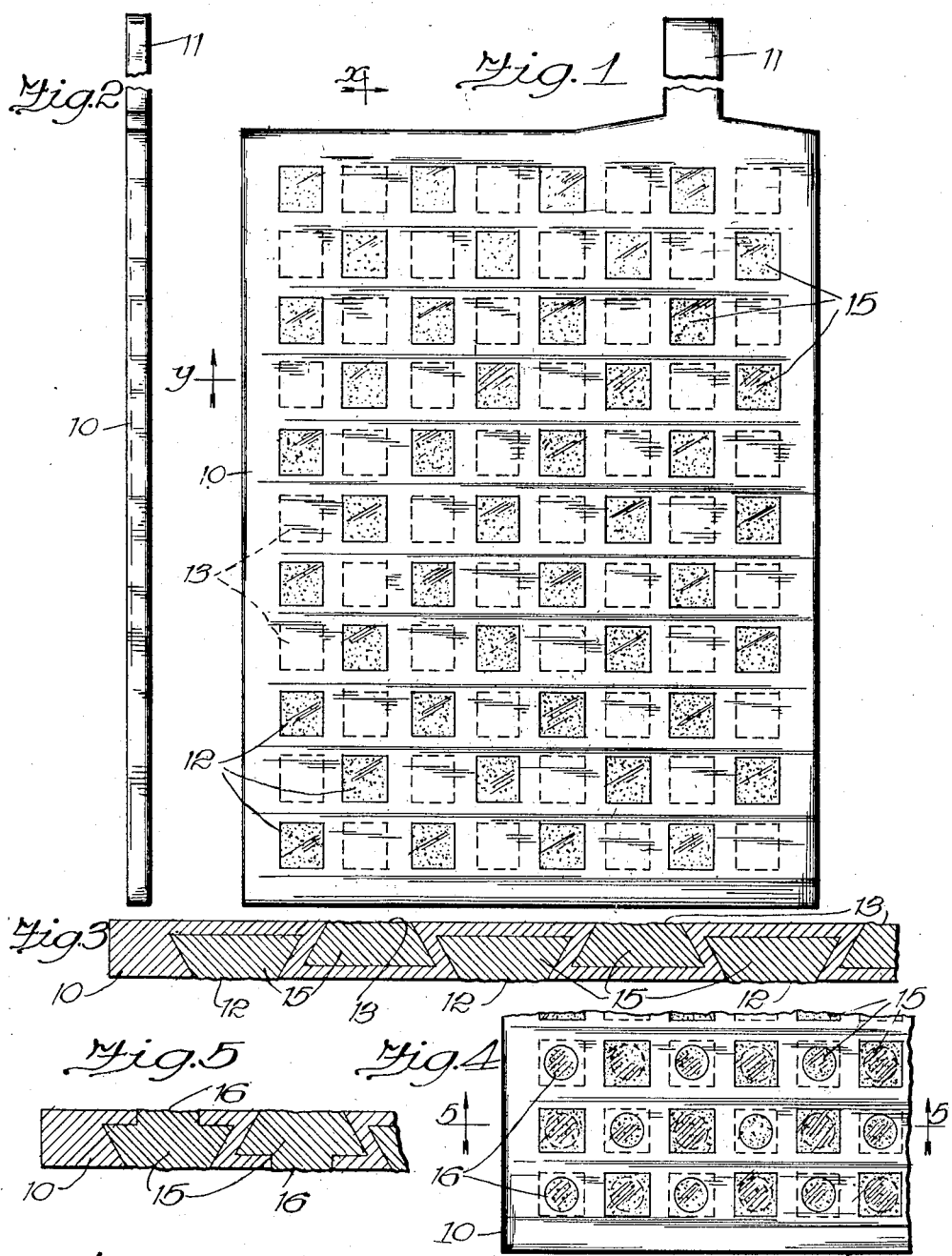

UNITED STATES PATENT OFFICE.

PAUL B. RABE, OF CHICAGO, ILLINOIS, ASSIGNOR TO O. K. GIANT BATTERY CO., OF GARY, INDIANA, A CORPORATION OF DELAWARE.

BATTERY-GRID.

1,347,873.   Specification of Letters Patent.   Patented July 27, 1920.

Application filed April 30, 1919. Serial No. 293,607.

*To all whom it may concern:*

Be it known that I, PAUL B. RABE, a citizen of the United States, residing at Chicago, in the county of Cook and State of Illinois, have invented a certain new and useful Improvement in Battery-Grids, of which the following is a full, clear, concise, and exact description, reference being had to the accompanying drawings, forming a part of this specification.

My invention relates to grid plates such as are employed in connection with storage batteries, and briefly stated the object of my invention is to provide a cellular grid plate, which is highly efficient in that it effectually supports the proper anode or cathode grid paste with which such plates are provided when in use in a battery; and at the same time exposes a substantial area of the said grid paste to the electrolyte, which is of course highly desirable. As is well known, the substances, or compounds constituting the grid paste with which storage battery plates are provided are characteristically fragile, and have a tendency to disintegrate, and to become separated from the grid plate by which they are carried.

One of the problems which confronts manufacturers of storage battery plates is to provide a grid plate which will satisfactorily support such a grid paste, and at the same time expose sufficient surface of the latter to the electrolyte.

The grid plate of my invention is characterized by the fact that it provides a large number of paste receiving cells substantially frusto-pyramidal in shape. The open sides of the cells are at their smaller ends so that the paste is retained in the plate by the tapering cell walls. The several cells are distributed in ranks and files with alternate cells in each rank and each file opening on one side of the plate, and with the intervening cells in each rank and each file opening on the opposite side of the plate. By thus locating and forming the cells, it is possible to utilize a minimum amount of metal in forming a grid plate having a maximum number of cells, due to the fact that all of the cell walls may be of small and uniform thickness, since the side walls of each cell also constitute side walls of adjacent cells in the same rank or the same file.

In the accompanying drawing illustrating my invention—

Figure 1 is an elevational view of a grid plate embodying the improvements of my invention;

Fig. 2 is a side elevation thereof;

Fig. 3 is an enlarged fragmentary cross sectional view, which may be considered as having been taken on either the line $x$—$x$ of Fig. 1 or the line $y$—$y$ of Fig. 1, since the sections taken on the lines mentioned are identical.

Fig. 4 is a fragmentary elevational view of a slightly modified grid plate construction; and Fig. 5 is a view similar to Fig. 3 of the modified construction shown in Fig. 4.

Similar characters of reference refer to similar parts throughout the several views.

The battery grid plate shown in the drawings is formed in one piece of a suitable metallic material, such, for instance, as alloy of lead and antimony, which possesses the necessary mechanical strength and at the same time produces no objectionable local action in the presence of the other substances in the storage battery cell.

The structure comprises the body portion or grid plate proper, indicated at 10, and the integral upwardly extending arm 11, to which a terminal or jumper may be "burned" or otherwise electrically connected in any well-known manner. Formed in the grid plate are a plurality of cells which, for the sake of convenience, have been designated 12, 12 and 13, 13, and which are adapted to receive a suitable and well known storage battery grid paste illustrated at 15. It will be noted that cells 12, 12 open on one side of the plate, whereas cells 13, 13 open on the opposite side of the plate. All of the cells are substantially frusto-pyramidal in shape, and are distributed through the plate in ranks and files, as shown in the drawings, with alternate cells in each rank and each file opening on one side of the plate, while the intervening cells open on the opposite side of the plate.

Because of the fact that the cells 12, 12 and 13, 13 are substantially frusto-pyramidal in shape, and because of the fact that cells 12, 12 and cells 13, 13 are reversed with respect to the location of their narrow and wide ends, it is possible to utilize a minimum amount of metal for forming the grid plate. All of the cell walls are of substantially the same thickness and the side walls of each cell 12 constitute the side walls of its adjacent cells 13, 13, as is clearly illustrated in Fig. 3.

The grid structure described is very advantageous in that it makes it possible to place a large quantity of grid paste in a grid of limited dimensions, and furthermore, because the paste is effectually held in the grid plate due to the frusto-pyramidal shape of the several grid plate cells.

If desired, the exposed grid paste surface may be increased somewhat over that obtainable in the structure just described, by employing the slightly modified arrangement illustrated in Figs. 4 and 5. It will be noted that in this modified arrangement an aperture 16 of less area than the rear walls of the paste receiving cells is formed in the rear wall of each paste receiving cell, so that the paste in each cell is exposed on each side of the plate without, however, losing the paste retaining advantage, due to the frusto-pyramidal shape of the several cells.

Having thus described my invention, what I claim as new and desire to secure by Letters Patent of the United States is:

1. A grid plate for storage batteries, having a plurality of grid paste receiving cells formed therein, said cells being arranged in ranks and files, and of substantially frusto-pyramidal shape, the alternate cells in each rank and each file having their small ends opening on one side of the plate, and the intervening cells in each rank and each file having their small ends opening on the other side of the plate.

2. A grid plate for storage batteries, having a multiplicity of paste receiving cells of substantially frusto-pyramidal shape formed therein, in ranks and files, with the common walls for adjacent cells in each rank and each file of substantially uniform thickness.

3. A grid plate for storage batteries, having a plurality of grid paste receiving cells of substantially frusto-pyramidal shape formed therein, said cells being arranged in ranks and files and each having its walls tapering to an opening at one of the plate faces, alternate cells in each rank and each file being open on the same side of the plate, the intervening cells of each rank and each file being open at the opposite side of the plate, the common walls for adjacent cells in each rank and each file being of substantially uniform thickness.

In witness whereof, I hereunto subscribe my name this 22 day of April, 1919.

PAUL B. RABE.

Witnesses:
MARY FAE PETRIE,
EDNA V. GUSTAFSON.